(12) United States Patent
Rieder et al.

(10) Patent No.: US 7,406,878 B2
(45) Date of Patent: Aug. 5, 2008

(54) METHOD FOR MEASURING A MEDIUM FLOWING IN A PIPELINE AND MEASUREMENT SYSTEM THEREFOR

(75) Inventors: Alfred Rieder, Landshut (DE); Wolfgang Drahm, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 120 days.

(21) Appl. No.: 11/527,634

(22) Filed: Sep. 27, 2006

(65) Prior Publication Data

US 2007/0084298 A1 Apr. 19, 2007

Related U.S. Application Data

(60) Provisional application No. 60/720,456, filed on Sep. 27, 2005.

(30) Foreign Application Priority Data

Sep. 27, 2005 (DE) ........................ 10 2005 046 319

(51) Int. Cl.
G01F 1/84 (2006.01)
(52) U.S. Cl. ................................. 73/861.355
(58) Field of Classification Search ............. 73/861.355
See application file for complete search history.

(56) References Cited

U.S. PATENT DOCUMENTS

| | | |
|---|---|---|
| 6,422,092 B1 | 7/2002 | Morrison |
| 2004/0254748 A1 * | 12/2004 | Kopp ........................... 702/50 |
| 2005/0061060 A1 | 3/2005 | Gysling |
| 2005/0138993 A1 | 6/2005 | Mattar |
| 2005/0193832 A1 | 9/2005 | Tombs |

FOREIGN PATENT DOCUMENTS

| | | |
|---|---|---|
| DE | 10 2004 014 029 A1 | 10/2005 |
| WO | WO 03/08452 | 4/1993 |
| WO | WO 93/19348 | 9/1993 |
| WO | WO 00/36379 | 6/2000 |

OTHER PUBLICATIONS

P. Kalotay, "On-Line Viscosity Measurement using Coriolis Mass Flowmeters", XP00612473, Flow Meas. Instrum., 1994, vol. 5, No. 4.

* cited by examiner

*Primary Examiner*—Harshad Patel
(74) *Attorney, Agent, or Firm*—Bacon & Thomas, PLLC

(57) ABSTRACT

For measuring a medium, the medium flows through at least one inline measuring device measuring tube joined into the course of a pipeline, especially a measuring tube which vibrates, at least at times. Using an inline measuring device sensor arrangement arranged on the measuring tube and/or in its vicinity and reacting, at least mediately, to changes of the at least one physical parameter of the medium, at least one measurement signal is produced, which is influenced by at least one physical parameter of the medium in the measuring tube. Additionally, pressures effective in the medium are registered, in order to determine repeatedly a pressure difference existing in the flowing medium at least in part along the at least one measuring tube. Taking into consideration a pressure difference currently determined for the flowing medium, as well as applying a transfer function, measured values of a first kind are produced, which represent, following in time one after the other, the at least one flow parameter to be measured for the medium. The transfer function determines, in such case, at least how the measured values of the first kind are generated under application of the pressure difference currently determined for the flowing medium. Taking into consideration the at least one measurement signal produced by means of the sensor arrangement of the inline measuring device, the transfer function is repeatedly adapted to the medium to be measured. The method serves especially for the measuring of media, which are, at least at times, present as two, or more, phases, of which at least one is a fluid phase.

38 Claims, 5 Drawing Sheets

METHOD FOR MEASURING A MEDIUM FLOWING IN A PIPELINE AND MEASUREMENT SYSTEM THEREFOR

This application claims the benefit of provisional application No. 60/720,456 filed on Sep. 27, 2005.

FIELD OF THE INVENTION

The invention relates to a method for measuring at least one physical, flow parameter, especially a mass flow and/or a density and/or a viscosity, of a two, or more, phase medium flowing in a pipeline, as well as a measurement system suited therefor.

BACKGROUND OF THE INVENTION

In process measurements and automation technology, for the highly accurate measurement of physical parameters, such as e.g. mass flow, density and/or viscosity, of a medium flowing in a pipeline, for example a gas and/or a liquid, often such inline measuring devices are used, which, by means of a measurement pickup, or transducer, of vibration-type, through which the medium is flowing, and a measurement and operating circuit connected thereto, effect reaction forces in the medium, forces such as e.g. Coriolis forces corresponding with mass flow, inertial forces corresponding with density, or frictional forces corresponding with viscosity, etc., and produce, derived from these, a measurement signal representing, for the medium, mass flow, viscosity and/or density, as the case may be. Such inline measuring devices with a measurement pickup of vibration-type, as well as their manner of operation, are known per se to those skilled in the art and are described comprehensively and in detail e.g. in WO-A 03/095950, WO-A 03/095949, WO-A 02/37063, WO-A 01/33174, WO-A 00/57141, WO-A 99/39164, WO-A 98/07009, WO-A 95/16897, WO-A 88/03261, US 2003/0208325, U.S. Pat. Nos. 6,880,410, 6,691,583, 6,651,513, 6,513,393, 6,505,519, 6,006,609, 5,869,770, 5,861,561, 5,796,011, 5,616,868, 5,602,346, 5,602,345, 5,531,126, 5,359,881, 5,301,557, 5,253,533, 5,218,873, 5,069,074, 4,876,898, 4,733,569, 4,660,421, 4,524,610, 4,491,025, 4,187,721, EP-A 1 291 639, EP-A 1 281 938, EP-A 1 001 254 or EP-A 553 939.

For the conveying of the flowing medium, the measurement pickups include, in each case, at least one measuring tube with a bent and/or straight tube segment, which is caused, during operation, to vibrate, driven by an electromechanical exciter mechanism, for producing the above-mentioned, reaction forces. The measuring tube is held in a support frame most often embodied as a closed, pickup housing. For registering vibrations, especially inlet-side and outlet-side vibrations, of the tube segment, the measurement pickups further include, in each case, a sensor arrangement reacting to movements of the tube segment.

In the case of Coriolis mass flow measuring devices, measurement of the mass flow of a medium flowing in a pipeline rests, as is known, on the allowing of the medium to flow through the measuring tube inserted into the pipeline and oscillating during operation, at least in part, laterally to a measuring tube axis, whereby Coriolis forces are induced in the medium. These forces, in turn, effect, that inlet end and outlet end regions of the measuring tube oscillate shifted in phase relative to one another. The size of these phase shifts serves, in such case, as a measure for the mass flow rate. The oscillations of the measuring tube are, therefore, registered by means of two oscillation sensors of the aforementioned sensor arrangement spaced from one another along the measuring tube and transformed into oscillation measurement signals, from whose phase shift with respect to one another the mass flow is derived. Already the initially referenced U.S. Pat. No. 4,187,721 mentions, additionally, that also the instantaneous density of the flowing medium is measurable by means of such inline measuring devices, and, indeed, on the basis of a frequency of at least one of the oscillation measurement signals delivered by the sensor arrangement. Moreover, most often, also a temperature of the medium is directly measured in suitable manner, for example by means of a temperature sensor arranged on the measuring tube. Additionally, straight measuring tubes can, when excited to torsional oscillations about a torsional oscillation axis essentially extending parallel to, or coinciding with, the pertinent measuring tube longitudinal axis, effect that radial shear forces are produced in the medium conveyed therethrough, whereby, in turn, significant oscillatory energy is withdrawn to the torsional oscillations and dissipated in the medium. As a result thereof, a considerable damping of the torsional oscillations of the oscillating measuring tube occurs, so that, to maintain the torsional oscillations, additional electrical exciting power must be supplied to the measuring tube. Derived from a correspondingly required electrical exciting power for the maintaining of the torsional oscillations of the measuring tube, it is possible, in manner known to those skilled in the art, so also to determine, at least approximately, a viscosity of the medium; compare, in this connection, especially also U.S. Pat. Nos. 4,524,610, 5,253,533, 6,006,609 or 6,651,513. It is possible, therefore, to assume, without more, in the following that, even when not expressly described, modern inline measuring devices with measurement pickups of vibration-type, especially Coriolis mass flow measuring devices, can be used, in any case, also to measure density, viscosity and/or temperature of the medium, especially since these variables are often drawn upon, in the case of mass flow measurement, in any event, for the compensating of measurement errors arising due to fluctuating medium density and/or viscosity; compare, in this connection, especially the already mentioned U.S. Pat. Nos. 6,513,393, 6,006,609, 5,602,346, WO-A 02/37063, WO-A 99/39164 or also WO-A 00/36379.

Besides such measurement pickups, or transducers, of vibration type, frequently also inline measuring devices with magneto-inductive pickups, or transducers, or measurement pickups, or transducers, evaluating the travel time of ultrasonic waves emitted in the stream direction, especially also those working on the basis of the Doppler principle, are used in process measurements and automation technology for inline measurements. Since the principles of construction and manner of functioning of such magnetic-inductive measurement pickups are described adequately e.g. in EP-A 1 039 269, U.S. Pat. No. 6,031,740, 5,540,103, 5,351,554, 4,563,904, etc., and the principles of construction and manner of functioning of such ultrasonic measurement pickups are described adequately e.g. in U.S. Pat. Nos. 6,397,683, 6,330,831, 6,293,156, 6,189,389, 5,531,124, 5,463,905, 5,131,279, 4,787,252 etc., and, moreover, are likewise sufficiently known to those skilled in the art, a detailed explanation of these principles of measurement can be omitted here.

In the use of such inline measuring devices comprising at least one measuring tube joined into the course of the pipeline conveying the medium, it has, however, been found, that, in the case of inhomogeneous media, especially two, or more, phase media, the measurement signals produced therewith can be subject, to a considerable degree, to non-reproducible fluctuations, even though the medium parameters significantly influencing the measurement signals, especially the mass flow rate, are held essentially constant; compare, in this connection, also the initially mentioned U.S. Pat. No. 6,910, 366, U.S. Pat. No. 6,880,410, U.S. Pat. No. 6,505,519, U.S. Pat. No. 6,311,136 or U.S. Pat. No. 5,400,657. As a result, these measurement signals in the case of multiphase streams of medium are practically unusable for a highly accurate measurement of the physical flow parameter of interest. Such inhomogeneous media can be, for example, liquids, in which, as e.g. practically unavoidable in metering or bottling processes, a gas present in the pipeline, particularly air, is entrained, or from which a dissolved medium, e.g. carbon dioxide, outgasses and leads to foam formation. As further examples of such inhomogeneous media, also emulsions, wet, or saturated, steam, as well as fluids carrying solid particles can be mentioned.

Especially in the case of inline measuring devices comprising a measurement pickup of vibration-type, such as, for example, also discussed in JP-A 10-281846, EP-A 1 291 639, U.S. Pat. No. 6,880,410, 6,505,519, it has been found that the oscillation measurement signals derived from the oscillations of the measurement tube, especially also the mentioned phase shift, are, in the case of two, or more, phase media, and in spite of keeping the mass flow rate, as well as also viscosity and density in the separate phases of a medium, practically constant and/or appropriately taking such into consideration, subject to fluctuations to a significant degree and, therefore, in given instances, can be completely unusable for measuring the physical flow parameter of interest, unless remedial measures are undertaken. Mentionable as reasons for the measurement errors accompanying the measurement of inhomogeneous media by means of measurement pickups of vibration-type include, for example, the unilateral clinging or depositing of liquid-entrained, gas bubbles or solid particles on the measuring tube wall, and the so-called "bubble-effect", in the case of which gas bubbles entrained in the liquid act as flow bodies for liquid volume elements accelerated transversely to the longitudinal axis of the measuring tube.

For lessening the measurement errors accompanying two, or more, phase media, U.S. Pat. No. 6,880,410, for example, proposes a flow, or medium, conditioning to precede the actual flow measurement. As another possibility for escaping the problems of such measurement pickups in connection with inhomogeneous media, for example, both in JP-A 10-281846, as well as also in U.S. Pat. No. 6,505,519, a correction of the flow measurement, especially of the mass flow measurement, determined from the oscillation measurement signals, is made. The correction is based especially on the evaluation of deficits between a highly accurately measured, actual density of the medium and an apparent density of the medium determined during operation using Coriolis mass flow measuring devices. Further methods for avoiding and/or correction of measurement errors associated with two, or more, phase media, beyond those mentioned above, are described in U.S. Pat. No. 2005/0081643, U.S. Pat. No. 2005/0022611, WO-A 2005/057137 or WO-A 2005/057131.

Alternatively or in supplementation thereof, additionally, also measurement systems, especially diversely operating measurement systems, formed by means of a plurality of inline measuring devices and disclosed e.g. in U.S. Pat. Nos. 5,400,657, 5,259,250, 2005/0016292 or WO-A 03/062759, WO-A 03/073047, WO-A 03/087735, or WO-A 04/046660, can be applied for measuring two, or more, phase media. However, a significant disadvantage of such, actually quite precisely measuring, measurement systems can reside in their increased complexity and the accompanying high installation costs, on the one hand, and the high servicing and maintenance costs, on the other hand. Moreover, such measurement systems possess, most often, a relatively high requirement for space.

SUMMARY OF THE INVENTION

An object of the invention, therefore, is to provide a method, which is suited for measuring, on the one hand, flow velocity, mass flow or volume flow of a medium flowing in a pipeline, as accurately as possible, also for the case in which the medium is formed of two, or more, phases, and, on the other hand, for the case, in which the medium is essentially of one phase, so accurately that any measurement error is essentially smaller than 5%, especially smaller than 1%. Additionally, it is an object of the invention to provide a correspondingly suited measurement system, especially also a measurement system using principles of diversity, which can be constructed as simply and/or as modularly as possible, especially by using conventional inline measuring devices.

To achieve the object, the invention resides in a method for measuring at least one flow parameter, especially a flow velocity, mass flow rate or volume flow rate, of a medium flowing in a pipeline and which, at least at times, is of two, or more, phases, of which at least one phase is fluid, which method includes the following steps:

allowing the medium to be measured to flow through at least one measuring tube of an inline measuring tube of an inline measuring device for flowing media, the measuring tube being joined into the course of the pipeline and being, especially, a measuring tube which vibrates, at least at times;

producing at least one measurement signal influenced by at least one physical parameter, especially a flow velocity, a mass flow rate, a volume flow rate, a density and/or a viscosity of the medium in the measuring tube, using a sensor arrangement of the inline measuring device, the sensor arrangement being arranged on the measuring tube and/or in its vicinity and reacting, at least mediately, to changes of the at least one physical parameter of the medium;

registering pressures effective in the medium, especially static pressures, for the repeated determining of a pressure difference prevailing in the flowing medium, especially at least in part along the at least one measuring tube; and producing measured values of a first kind, which represent, following one after the other in time, and especially digitally, the at least one flow parameter of the medium to be measured, taking into consideration a pressure difference currently determined for the flowing medium and applying a transfer function;

wherein the transfer function at least determines how the measured values of the first kind are generated using the pressure difference currently determined for the flowing medium; and wherein the transfer function is repeatedly adapted to the medium to be measured, taking into consideration the at least one measurement signal produced by means of the sensor arrangement of the inline measuring device.

Furthermore, the invention resides in a measurement system for measuring at least one physical flow parameter, especially a mass and/or volume, flow and/or a flow velocity, of an, at least at times, two, or more, phase medium flowing in a pipeline, of which at least one phase is fluid, which measurement system includes:

an inline measuring device for flowing media, which measuring device includes a flow pickup, as well as a measuring device electronics electrically coupled, at least at times, with the flow pickup, with the flow pickup including at least one measuring tube inserted into the course of the pipeline conveying the medium, especially a measuring tube vibrating, at least at times, during operation; and a pressure-difference measuring device comprising a first pressure pickup, especially one arranged on the inlet side of the flow pickup, for registering a first pressure prevailing in the medium, and a second pressure pickup, especially one arranged on the outlet side of the flow pickup, for registering a second pressure prevailing in the medium, as well as a measuring device electronics, which is electrically coupled, at least at times, with the pressure pickups and at least at times with the measuring device electronics of the inline measuring device;

wherein at least one of the two measuring device electronics produces, using a transfer function stored therein, as well as based on the pressures registered by means of the first and second pressure pickups, at least at times, measured values of a first kind, which represent, following one after the other in time, especially digitally, the at least one flow parameter of the medium to be measured;

wherein the measuring device electronics of the inline measuring device produces, at least at times, measured values of a second kind, which represent, following one after the other in time, especially digitally, the at least one parameter of the medium in the at least one measuring tube, or a measured variable of the medium derived therefrom; and wherein the transfer function at least determines how the measured values of the first kind are generated on the basis of the currently registered, first and second pressures, and, taking into consideration at least one of the measured values of the second kind produced by the inline measuring device, is repeatedly adapted to the medium to be measured.

In a first embodiment of the method of the invention, the at least one measuring tube vibrates, at least at times, during operation.

In a second embodiment of the method of the invention, the method further includes steps of producing measured values of a second kind, which represent, on the basis of the at least one measurement signal produced by means of the inline measuring device, following one after the other in time, the at least one parameter of the medium in the measuring tube or a measured variable of the medium derived therefrom. In a first, further development of the first embodiment of the invention, measured values of the first kind and measured values of the second kind are produced essentially simultaneously, or, at least, near in time to one another. In a second, further development of the first embodiment of the invention, measured values of the first kind and measured values of the second kind are produced essentially asynchronously, or, at least, shifted in time, especially alternately. In a third, further development of the first embodiment of the invention, measured values of the second kind are produced, at least timewise, when the medium is developed essentially as one phase, or, at least, assumed to be developed as one phase.

In a fourth, further development of the first embodiment of the invention, the measured values of the second kind are determined at least in part, on the basis of the registered vibrations of the measuring tube.

In a fifth, further development of the first embodiment of the invention, the measured values of the second kind are generated, at least timewise and/or at least in part based on an oscillation frequency of the vibrating measuring tube, especially an oscillation frequency determined using the at least one measurement signal.

In a sixth, further development of the first embodiment of the invention, such further includes steps of producing at least a first measurement signal representing vibrations of the measuring tube, especially a measurement signal representing inlet-side vibrations of the measuring tube, by means of a first oscillation sensor of the sensor arrangement, and a second measurement signal representing vibrations of the measuring tube, especially a measurement signal representing outlet-side vibrations of the measuring tube, by means of a second oscillation sensor of the sensor arrangement, with the sensor arrangement of the inline measuring device comprising at least two oscillation sensors spaced from one another, especially in the flow direction of the medium, and, in each case, arranged on the measuring tube and/or in its vicinity. Especially, it is provided in the case of this further development, that the measured values of the second kind represent a mass flow or a volume flow, of the medium, with the at least two measurement signals produced by means of the sensor arrangement of the inline measuring device being used for determining at least one of these measured values of the second kind.

In a seventh, further development of the first embodiment of the invention, the measured values of the second kind are determined, as least at times and/or at least in part, based on a phase difference existing between the first and the second measurement signals.

In an eighth, further development of the first embodiment of the invention, the measured values of the second kind represent a parameter of the medium, which corresponds essentially to the flow parameter representing the measured values of the first kind.

In a ninth, further development of the first embodiment of the invention, the measured values of the second kind represent a density of the medium in the measuring tube.

In a tenth, further development of the first embodiment of the invention, the measured values of the second kind represent a viscosity of the medium in the measuring tube.

In a third embodiment of the method of the invention, such further includes steps of repeatedly monitoring the flowing medium, especially using the at least one measurement signal produced by means of the inline measuring device.

In a fourth embodiment of the method of the invention, such further includes a step of detecting that the medium is developed at least as two phases.

In a fifth embodiment of the method of the invention, the inline measuring device further includes an electrical-to-physical exciter mechanism arranged on the at least one measuring tube and acting, at least mediately, on the medium conveyed therein.

In a sixth embodiment of the method of the invention, the step of producing the first measurement signal includes the following additional steps:

producing, by means of the exciter mechanism of the inline measuring device, reactions in the medium corresponding to the at least one physical parameter of the medium in the measuring tube; and registering, by means of the sensor arrangement of the inline measuring device, reactions of the medium corresponding to the at least one physical parameter of the medium in the measuring tube.

In a seventh embodiment of the method of the invention, the inline measuring device involves a measurement pickup of vibration-type, and the step of producing reactions in the medium corresponding with the at least one physical parameter of the medium in the measuring tube includes a step of causing the measuring tube to vibrate for producing, in the medium conveyed therein, reaction forces, especially inertial forces, frictional forces and/or Coriolis forces, influenced by vibrations of the measuring tube.

In an eighth embodiment of the method of the invention, the step of registering reactions of the medium corresponding with the at least one physical parameter of the medium in the measuring tube by means of the sensor arrangement further includes a step of registering vibrations of the measuring tube.

In a ninth embodiment of the method of the invention, the sensor arrangement of the inline measuring device includes at least one oscillation sensor arranged on the measuring tube and/or in its vicinity, and the at least one measurement signal produced by means of the sensor arrangement of the inline measuring device represents vibrations of the measuring tube.

In a tenth embodiment of the method of the invention, the steps of registering pressures effective in the medium include steps of registering at least one pressure effective in the flowing medium at the inlet side of the at least one measuring tube and/or steps of registering at least one pressure effective in the flowing medium at the outlet side of the at least one measuring tube.

In an eleventh embodiment of the method of the invention, at least at times, at least a first pressure registered at the inlet side of the measuring tube and at least a second pressure registered at the outlet side of the measuring tube, especially a pressure difference in the flowing medium determined on the basis of the first and second pressures, are/is taken into consideration in the producing of the measured values representing the at least one, physical, flow parameter.

In a twelfth embodiment of the method of the invention, for registering pressures existing in the flowing medium, at least two pressure pickups are used, of which a first pressure pickup is located at the inlet side of the at least one measuring tube and a second pressure pickup is located at the outlet side of the at least one measuring tube.

In a thirteenth embodiment of the method of the invention, the steps of registering pressures effective in the medium include steps of transmitting pressures registered by means of the first and second pressure pickups via pressure intermediaries to a pressure measurement cell, especially a pressure measurement cell measuring differentially and/or capacitively.

In a fourteenth embodiment of the method of the invention, the steps of registering pressures effective in the medium include steps of converting pressures transmitted to the pressure measurement cell into at least one measurement signal, which reacts to time changes of at one of the registered changes with a corresponding change of at least one of its characteristics.

In a fifteenth embodiment of the method of the invention, the transfer function is a static, especially non-linear, characteristic curve function.

In a sixteenth embodiment of the method of the invention, for adapting the transfer function to the medium to be measured, at least one coefficient describing the transfer function is changed using the at least one measurement signal produced by means of the sensor arrangement of the inline measuring device.

In a seventeenth embodiment of the method of the invention, the transfer function is a static, especially non-linear function, and, for adapting the transfer function to the medium to be measured, at least one coefficient describing the transfer function is changed using at least one of the measured values of the second kind.

In a first embodiment of the measurement system of the invention, the flow pickup delivers at least one measurement signal representing at least one vibration of the at least one measuring tube.

In a second embodiment of the measurement system of the invention, the at least one measuring tube is essentially straight.

In a third embodiment of the measurement system of the invention, the at least one measuring tube is curved, especially U- or V-shaped.

In a fourth embodiment of the measurement system of the invention, such further includes two measuring tubes, especially ones running essentially parallel to one another and/or essentially of equal structures, inserted into the course of the pipeline.

In a fifth embodiment of the measurement system of the invention, the two pressure pickups are connected with a pressure measurement cell, especially one measuring differentially and/or capacitively, to form a pressure-difference pickup.

In a sixth embodiment of the measurement system of the invention, the pressure-difference pickup delivers at least one measurement signal representing a pressure difference in the flowing medium.

In a seventh embodiment of the measurement system of the measurement system of the invention, such includes a first measuring device electronics, as well as a second measuring device electronics communicating, at least at times, therewith, with the flow pickup being electrically coupled with the first measuring device electronics to form an inline measuring device, especially a Coriolis mass flow/density measuring device, for media flowing in pipelines, with the two pressure pickups being electrically coupled with the second measuring device electronics to form a pressure-difference measuring device for media flowing in pipelines.

A basic idea of the invention is to create a measurement system with diversity, which is suited, on the one hand, to measure flow parameters of the described kind accurately, also in the case of two, or more, phase media, and by which, on the other hand, at least one of the measuring devices (the pressure-difference measuring device) is recalibratable repeatedly during operation, using the other measuring device (here, the inline measuring device) as master-unit. Another basic idea of the invention is to use the at least one measuring tube of the inline measuring device as a substitute for the orifice usually applied in conventional pressure-difference measuring devices for producing pressure drops, whereby, on the one hand, one flow-relevant component is saved and, on the other hand, in comparison to a serial connecting of conventional pressure-difference measuring devices with inline measuring devices of the described kind, a lesser pressure drop is caused in the pipeline, or in the through-flowing medium. The invention rests, in such case, especially on the recognition that pressure-difference measuring devices are, in the case of marked multiphase-flow, capable of measuring flow parameters of the kind considered here more robustly and, most often, also more accurately, than, for example, Coriolis mass flow meters. On the other hand, it was possible to determine that the actually lesser pressure drop via inline measuring devices of the described kind, especially when using bent measuring tubes, can still be sufficient to enable a flow measurement based thereon. This, the more so, because, for example, modern Coriolis mass flow measuring devices now have, via their measuring device electronics already in their standard embodiment, enormous computing capacities.

An advantage of the invention is, additionally, to be seen also in the fact that the measurement system and, therefore, also the method corresponding therewith, can be implemented by connecting together even conventional inline measuring devices of the described kind with conventional pressure-difference measuring devices. In such case, it is of special advantage, when at least one of the measuring devices applied for the measurement system of the invention has a programmable measuring device electronics, since, thereby, the measurement system can be implemented by solely slight reconfiguring of the firmware, especially the measurement signal evaluation, or the software components concerning the measured value determination, as the case may be, and a corresponding electric connection of the two measuring device electronics together, be it via a superordinated field bus or directly via the measured value issuing and/or in-reading, signal ports of the respective measurement device electronics. A further advantage of the invention is, additionally, to be seen in the fact that, for the measurement system, inline measuring devices established in industrial measurements and automation technology, exhibiting the most varied of measurement principles, such as e.g. those comprising a flow measurement pickup of vibration type, as well as also those using magneto-inductive measurement pickups or ultrasonic measurement pickups, can be used.

The invention and further advantages will now be explained in the following on the basis of examples of embodied in the figures of the drawing; equal parts are provided with equal reference characters in the figures. In case helpful for overviewability, repetition of reference characters in subsequent figures is omitted. The figures show as follows:

DETAILED DESCRIPTION OF EXEMPLARY EMBODIMENTS

Figure 1:
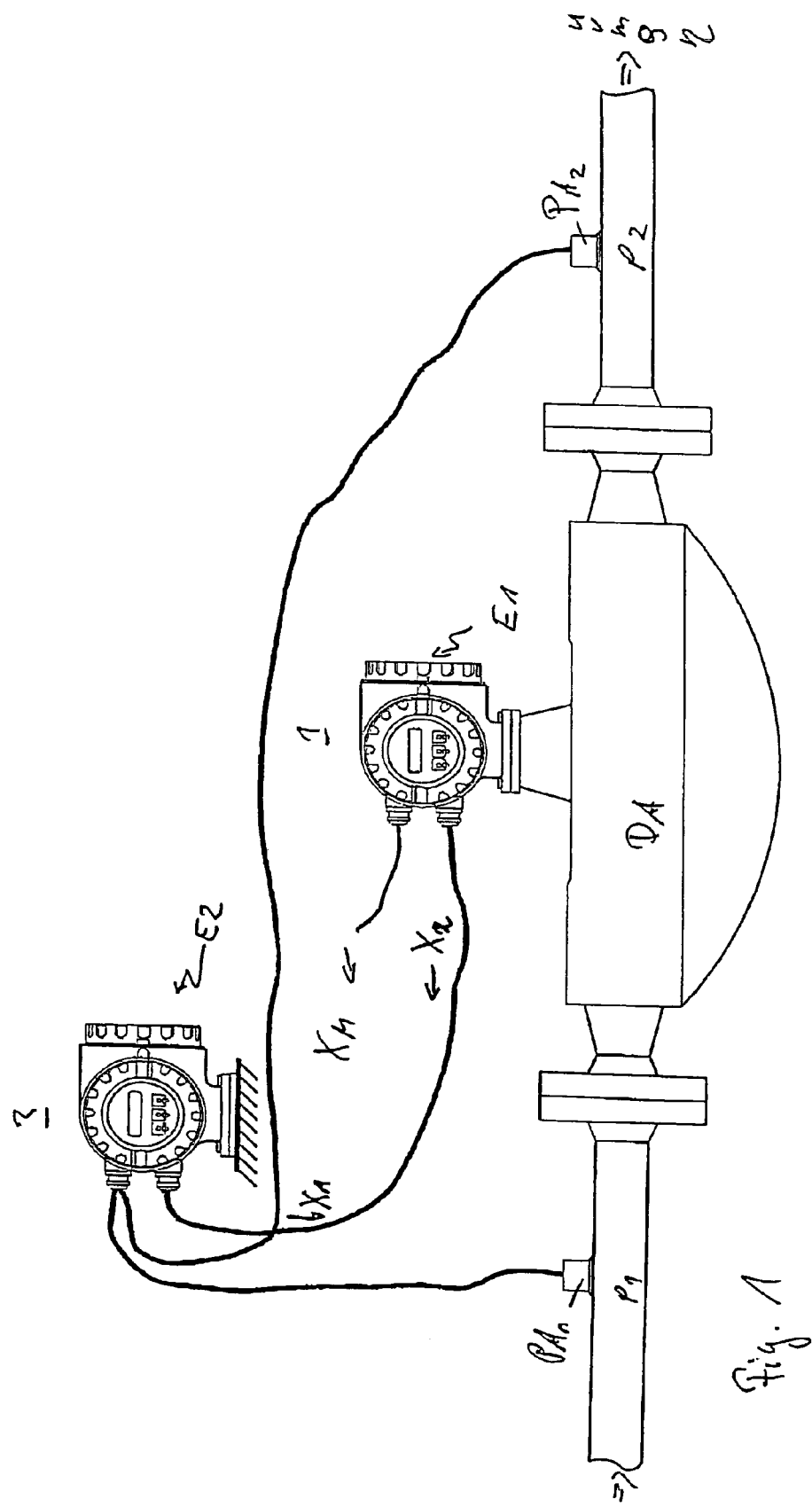
FIGS. 1 to 3 in each case, in side view, examples of embodiments of measurement systems, each formed by means of an inline measuring device and a pressure-difference measuring device, for measuring at least one physical, flow parameter of a medium flowing in a pipeline.

While the invention is susceptible to various modifications and alternative forms, exemplary embodiments thereof have been shown by way of example in the drawings and will herein be described in detail. It should be understood, however, that there is no intent to limit the invention to the particular forms diclosed, but on the contraiy, the intention is to cover all modifications, equivalents, and alternatives falling within the spirit and scope of the invention as defined by the intended claims.

Figure 2:
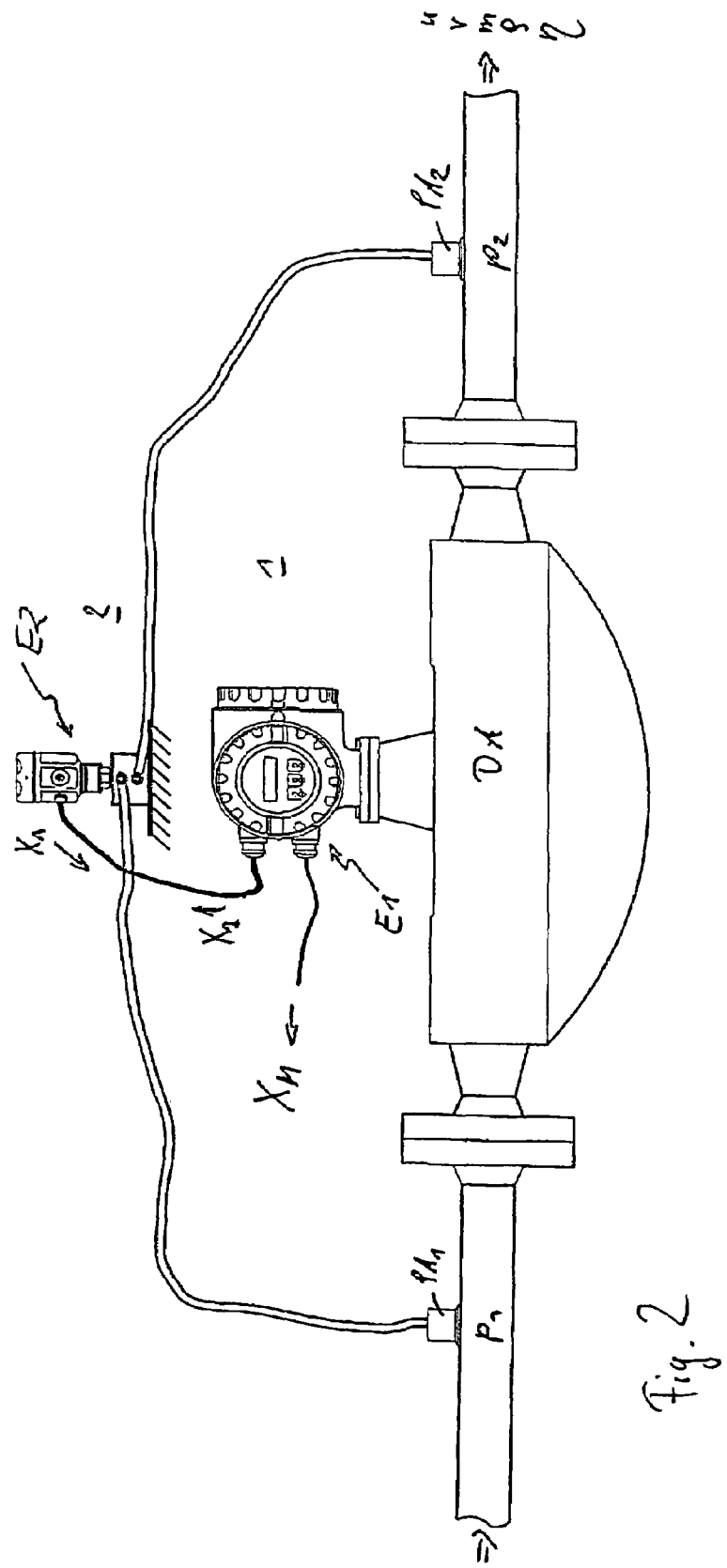
Figure 3:
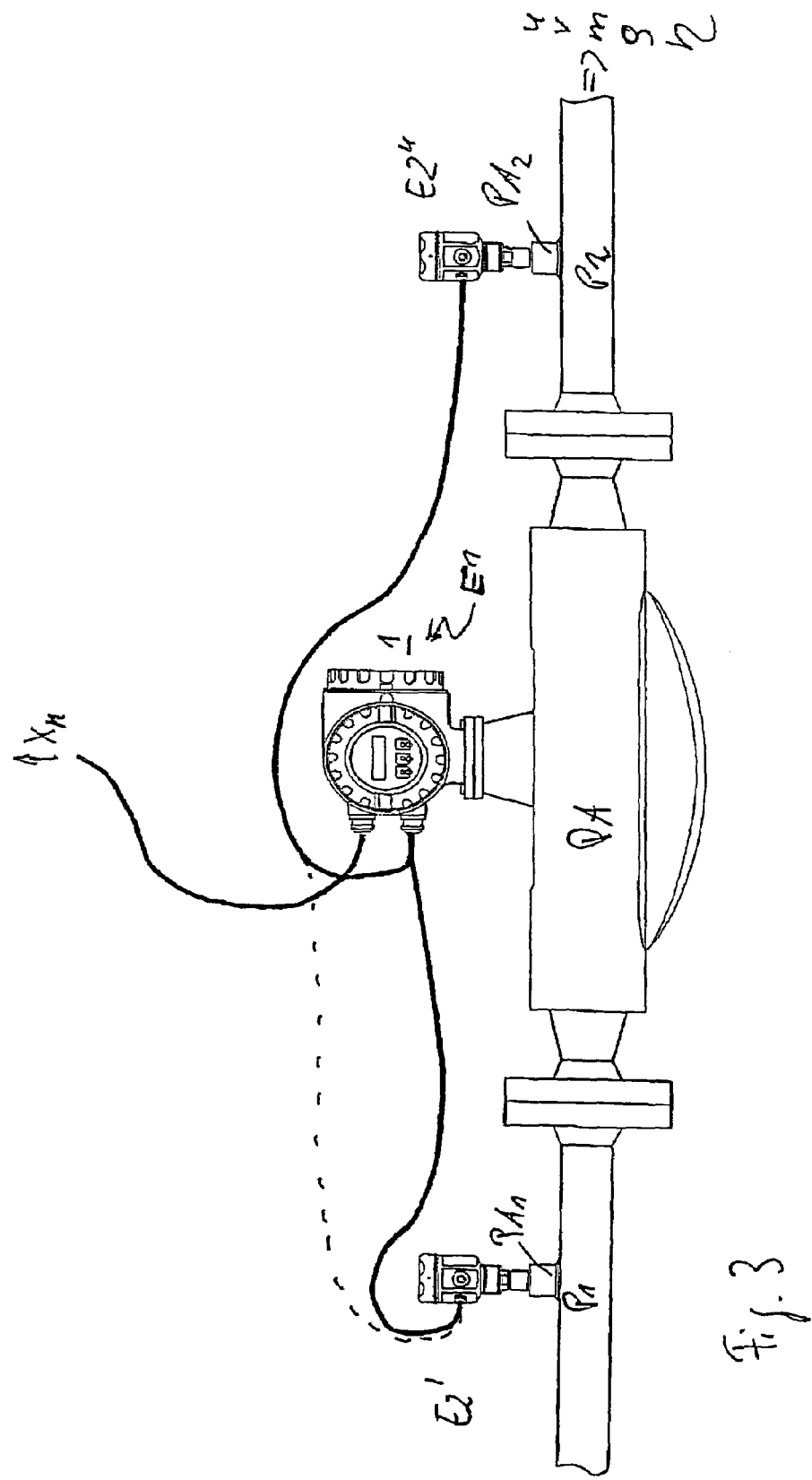

FIGS. 1 to 3 show, in each case, an example of an embodiment for a measurement system, especially one built modularly and/or with the principle of diversity, which is suited for, and provided for, very robustly measuring at least one physical, flow parameter, especially a mass flow rate m and/or volume flow rate v and/or a flow velocity u, of a medium flowing in a pipeline (not shown) and for representing such in at least one, corresponding, measured value $X_M$. Especially, the measurement system is further provided for measuring one or more of such physical, flow parameters of an, at least at times, two, or more, phase medium. The measurement system includes, for such purpose, at least one inline measuring device 1 for flowing media, with the inline measuring device 1 being formed by means of a corresponding flow pickup $DA_1$ as well as a first measuring device electronics E1 of the measurement system, electrically coupled, at least at times, therewith. Flow pickup DA includes, in such case, at least one measuring tube inserted into the course of the pipeline and through which the medium to be measured is allowed to flow, at least at times, during operation of the measurement system. The inline measuring device 1 is, especially, provided for producing, at least at times, at least one measurement signal, which is influenced by at least one physical parameter, especially a flow velocity, a mass flow rate m, a volume flow rate v, a density $\rho$ and/or a viscosity $\eta$ of the medium present in the measuring tube and, to such extent, appropriately corresponds with the parameter. Serving for producing the at least one measurement signal is, in such case, a sensor arrangement of the inline measuring device arranged on the measuring tube and/or in its vicinity and reacting, at least mediately, to changes of the at least one physical parameter of the medium in a manner appropriately influencing the at least one measurement signal.

In the example of an embodiment shown here, a Coriolis mass flow/density and/or viscosity meter, whose flow pickup DA is embodied as a measurement pickup of vibration-type, serves as inline measuring device. This especially because such an inline measuring device, at least for the case in which the medium is of two, or more, phases, is especially suited for registering the physical parameter, especially the mass flow rate m, density $\rho$ and/or viscosity $\eta$ of the medium to be measured, highly accurately. However, in such case, also other inline measuring devices equally established in the realm of process automation technology can be used to register the physical parameter, devices such as e.g. magneto-inductive flow meters, vortex flow measuring devices, or also ultrasonic measuring devices.

Besides the inline measuring device 1 (shown here as a Coriolis mass flow/density measuring device), the measurement system includes, further, a pressure-difference measuring device 2, which is formed by means of a first pressure pickup $PA_1$ for the registering of a first, especially static, pressure $p_1$ existing in the medium and a second pressure pickup $PA_2$ for the registering of a second, especially static, pressure $p_2$ existing in the medium, as well as by means of a second measuring device electronics E2, which, at least at times, is electrically coupled with the pressure pickups $PA_1$, $PA_2$ and at least at times with the measuring device electronics E1, which is, here, primarily associated with the inline measuring device.

In an embodiment of the invention, such as e.g. shown in FIG. 1, the first pressure pickup $PA_1$ is inserted into the pipeline at the inlet end of the flow pickup DA, especially in its immediate vicinity, and the second pressure pickup $PA_2$ is inserted into the pipeline at the outlet end of the flow pickup DA, especially at its immediate vicinity. Consequently, the measurement system thus registers by means of the first pressure pickup $PA_1$ at least one pressure $p_1$ effective in the flowing medium at the inlet end of the at least one measuring tube and/or, by means of the second pressure pickup $PA_2$, at least one pressure $p_2$ effective in the flowing medium at the outlet side of the at least one measuring tube.

The pressure pickups $PA_1$, $PA_2$ can, as also illustrated in FIG. 1, be pressure pickups converting the pressure on location, by means of, in each case, a pressure measurement cell arranged directly on the pipeline, into, in each case, an electrical measurement signal reacting to time changes of at least one of the registered pressures with a corresponding change of at least one of its properties; it is possible, however, for example, also, as shown schematically in FIG. 2, to use pressure pickups, which transfer the registered pressures via a corresponding pressure intermediary, for example a correspondingly ducted, oil-containing interface, to an, especially differentially measuring, pressure measurement cell and/or also a plurality of pressure measurement cells arranged in the vicinity of the second measuring device electronics E2, which cells then produce corresponding, electrical measurement signals for the registered pressures. A measurement signal produced in this way would then represent essentially directly a pressure difference in the flowing medium. A further opportunity for implementing the pressure difference measuring device 2 is, as shown schematically in FIG. 3 and as proposed, for example, also in U.S. Pat. No. 2004/0254748, to register the pressures $p_1$, $p_2$ with, in each case, a corresponding pressure sensor and to convert each of the locally registered pressures already immediately on location into corresponding pressure measured values representing the pressures $p_1$, $p_2$. The thus-produced pressure measured values can then, as shown in FIG. 3, be transmitted, for example singly, via corresponding data interfaces from the respective pressure sensors (here, thus, essentially, in each case, from a measuring device electronics portion E2', E2") to the measuring device electronics E1. The pressure measured values can, however, for example, also, as indicated by the dashed line in FIG. 3, be transferred from one pressure sensor to the other (here, thus, essentially from a measuring device electronics portion E2' to the other measuring device electronics portion E2") and, from there, sent to the measuring device electronics E1, as required, also as "electric" pressure difference. The pressure measurement cells used for the pressure pickups $PA_1$, $PA_2$ can be, for example, capacitively measuring measurement cells. Of course, however, also, as required, other pressure measurement cells converting the pressures registered and transferred from the medium into corresponding measurement signals can be used for the pressure pickups. Additionally, to be referenced, in this connection, are also the pressure pickups used conventionally in pressure difference measuring devices of the technology of flow measurements, especially also the construction and the connecting of their pressure measurement cells to the pipeline, as well as the flow-technical and electrical interconnecting of the pressure cells.

In the case of the measurement system of the invention, the two measuring device electronics E1, E2 are so coupled together, that, in the operation of at least one of the two measuring device electronics E1, E2, correspondingly produced measurement data can be transmitted, at least unidirectionally, to the other measuring device, for example in the form of measurement signals coded in their voltage, current and/or frequency, and/or in the form of measured values encapsulated in digitally coded telegrams; of course, instead of this, also data connections communicating bidirectionally between the two measuring device electronics E1, E2 can be used. For implementing the communication connection between the two measuring device electronics, standard interfaces correspondingly established in the technology of industrial measurements and automation can be used advantageously, such as e.g. line-conducted, 4-20 mA current loops, as required also in connection with HART(R) protocols, and/or suitable radio connections. Moreover, each of the two measuring devices, thus the inline measuring device and the pressure-difference measuring device, is connected via its respective measuring device electronics E1, E2, at least mediately, to an external energy, or power, supply, from which it can be fed with electric energy during operation. In such case, each of the two measuring device electronics E1, E1 can, for example, be connected separately to the external energy supply. Alternatively, or in supplementation, however, also one of the two measuring device electronics E1, E2 can be so connected to the other, that it can, at least at times, obtain its electric energy therefrom.

In an advantageous embodiment of the invention, at least one of the two measuring device electronics E1, E2 is additionally so constructed, that it can, during operation of the measurement system, exchange measurement and/or other operating data, especially also the at least one measured value $X_M$, with a measured value processing unit superordinated thereto, for example a programmable logic controller (PLC), a personal computer and/or a workstation, via a data transmission system, for example a field bus system. For this aforementioned case, in which the measurement system is provided for connection to a field bus or other communication system, at least the at least one measuring device electronics connected to the communication system includes a corresponding communication interface for a data communication, e.g. for transmitting measurement data to the already mentioned, programmable logic controller or a superordinated process control system. Also for this, for example, standard interfaces correspondingly established in the technology of industrial measurements and automation can be used. Moreover, also the external energy supply can be connected to the field bus system, and the measurement system can, in the previously described manner, be supplied with energy directly via the field bus system.

During operation, the measurement system produces, by means of at least one of the two measuring device electronics E1, E2, taking into consideration pressures $p_1$, $p_2$ registered by means of the first and second pressure pickups, at least at times, measured values $X_1$ of the first kind, which represent, especially digitally, following one after the other in time, the at least one flow parameter to be measured for the medium. For this purpose, stored in at least one of the measuring device electronics E1, E2, for example in that of the difference pressure measuring device, is a transfer function $f(p_1, p2, ..)$, which, at least, determines, how the measured values $X_1$ of the first kind are generated on the basis of the currently registered, first and second pressures $p_1$, $p_2$ by means of this measuring device electronics, i.e. at least the following should hold:

$$X_1 = f(p_1, p_2). \tag{1}$$

The transfer function $f(p_1, p_2, ...)$ used for production of the measured values of the first kind can be, for example, a purely static, linear or non-linear, characteristic curve function or also a dynamic transfer function taking into consideration transient transitional processes. The transfer function $f(p_1, p_2, ...)$ can be implemented, for example, by means of an ensemble of discrete, numerical, vertex values for a one- or multi-dimensional, characterizing field determined initially in a corresponding calibration of the measurement system and stored digitally in an, especially non-volatile, memory element of one of the measuring device electronics. The transfer function $f(p_1, p_2, ...)$ can, however, also be formed by a set of coefficients describing it parametrically, where the coefficients are likewise determined initially during the calibration and are stored digitally in the memory. For the case of a linear, static, characteristic line function, the then only two coefficients would be, for example, the known variables, zero point and sensitivity or slope.

In an embodiment of the invention, the measurement system determines, based on the pressures $p_1$, $p_2$ registered by means of the pressure-difference measuring device, repeatedly, a pressure difference $\Delta p$, which exists, at least in part, along the at least one measuring tube in the flowing medium. Further, the measurement system produces the measured value $X_1$ of the first kind taking into consideration a pressure difference currently determined as existing between the two pressures $p_1$, $p_2$ registered for the flowing medium. Accordingly, the measurement system determines, in the case of this embodiment of the invention, the measured values $X_1$ of the first kind, thus, based on the relationship:

$$X_1 = f((\Delta p)^n), \quad (2)$$

wherein the exponent lies in the region of about 0.5. For the case in which the physical flow parameter to be determined by means of the measurement system is a mass flow rate m, a volume flow rate v or an average flow velocity u, the measured values $X_1$ of the first kind are produced, for example, based on at least one of the following equations:

$$X_1 = K_u \cdot (\Delta p)^n, \quad (3)$$

$$X_1 = K_v \cdot (\Delta p)^n, \quad (4)$$

$$X_1 = K_m \cdot (\Delta p)^n, \quad (5)$$

wherein the coefficients Ku, Kv or Km mediate between the particular flow parameter to be measured, mass flow rate m, volume flow rate v or average flow velocity u, and a pressure difference measured by means of the two pressures $p_1$, $p_2$. The coefficients Ku, Kv or Km can, in such case, be dependent also on the instantaneous density $\rho$ of the medium, and, to that extent, are only for media with density constants fluctuating in small degree. For media with density fluctuating widely, the respective dependencies of the coefficients on the density $\rho$ are to be correspondingly taken into consideration according to the following proportionalities:

$$K_u \sim \sqrt{\frac{1}{\rho}} \quad (6)$$

$$K_v \sim \sqrt{\frac{1}{\rho}} \quad (7)$$

$$K_u \sim \sqrt{\rho}. \quad (8)$$

The aforementioned functions serving for the production of the measured values $X_1$ of the first kind, or the measured values $X_2$ of the second kind, as the case may be, symbolized by the Equations (1) to (8), can be implemented, at least in part, by means of a microcomputer correspondingly provided in the second measuring device electronics. The creation and implementation of appropriate algorithms, which correspond with, or map, the above-described equations, as well as their conversion into executable program code, is, per se, within the ability of those skilled in the art and requires, therefore, at least once one has knowledge of the present invention, no detailed explanation. Of course, the aforementioned equations can also be represented, without more, completely, or partially, by means of corresponding, discretely constructed, analog and/or digital, computing circuits in at least one of the two measuring device electronics E1, E2.

It is further provided in the measurement system of the invention that the measuring device electronics E1 of the inline measuring device 1 produces, at least at times, measured values $X_2$ of the second kind, which represent, especially digitally, in time following one after the other, the at least one parameter of the medium in the at least one measuring tube or a measurement variable derived therefrom. The measured values $X_1$ of the first kind and the measured values $X_2$ of the second kind can, in such case, be produced essentially simultaneously or, at least, near to one another in time, and, to such extent, can be synchronized with one another; the measured values of the first kind and the second kind can, however, also, as required, be produced essentially asynchronously and/or displaced in time with respect to one another, as required, using time stamps representing the point in time of the actual determining. Further, the measured values $X_1$ of the first kind can represent the same parameter as the measured values $X_2$ of the second kind, especially also in the same dimension or unit of measurement.

Furthermore, in the case of the measurement system of the invention, it is provided that the transfer function $f(p_1, p_2, \ldots)$ is adapted taking into consideration at least one measured value $X_2$ of the second kind, produced by means of the inline measuring device 1, for example, to the, in each case, current, at least one, physical parameter measured repeatedly for the medium to be measured and by means of the inline measuring device, for example, the density $\rho$ of the medium and/or its mass or volume flow rate m, v. "Adapt", in this case, can mean, for example, that, based on at least one measured value $X_2$ of the second kind, for example the current one, from a multitude of different transfer functions, of which each is implemented in the above-described manner, e.g. by means of digitally, non-volatilely stored coefficients or digitally, non-volatilely stored vertices, and of which each is matched to, in each case, at least one, initially associated, and, to such extent, classified feature of the at least one parameter to be measured by means of the inline measuring device, that transfer function is selected, which is best suited for this measured value $X_2$ of the second kind or a constellation of a plurality of such measured values $X_2$ of the second kind delivered by the inline measuring device. Adapting of the transfer function can, however, also mean that the measured value $X_2$ of the second kind delivered by means of the inline measuring device represents one of the flow parameters, mass flow rate m, volume flow rate v or average flow velocity u, and that, using this measured value $X_2$, as well as taking into consideration a current density $\rho$ of the medium, the, in each case, one constant Ku, Kv or Km correspondingly intermediating between the measured value $X_1$ of the first kind currently to be determined and the measured value $X_2$ of the second kind, which instantaneously most accurately represents the actual parameter, is repeatedly determined and, as required, corrected.

The currently best suited, here, thus, the "adapted", or "matched", transfer function can then finally be loaded from a non-volatile memory range, in the form e.g. of a table memory, in one of the two measuring device electronics E1, E2, into a volatile, working memory of the measuring device electronics E2 of the pressure-difference measuring device 2, and, consequently, be held available, as an updated transfer function, for the determination of the following measured values $X_1$ of the first kind. Advantageously, for this purpose, at least that one of the two measuring device electronics, which is storing the transfer function, is embodied as a programmable, especially also as a programmable during operation, and, in such respect, reconfigurable, or adaptable, measuring device electronics. The non-volatile memory can be, for example, a programmable, fixed-value memory, thus an FPGA (field programmable gate array), an EPROM or an EEPROM. The use of memory elements embodied as table memories has, among other things, the advantage that the transfer function is vary rapidly available during runtime, following calculation of the measured values $X_2$ of the second kind. Additionally, transfer functions entered into the table memory can be determined on the basis of few calibration measurements initially or even during operation of the measurement system very accurately, e.g. based on the Eqs. (3) to (8) and using the method of least squares. In case required, the adapting of the transfer function to the medium to be measured can also be achieved by transmitting the at least one measurement signal produced by means of the sensor arrangement of the inline measuring device 1 directly to the measuring device electronics E2 of the pressure-difference measuring device 2 and there converting it into a selection signal selecting the currently best suited transfer function, for example selecting a coefficient describing the transfer function.

The information exchange between the two measuring device electronics E1, E2 required for the adapting of the transfer function can, in such case, occur via the already mentioned, data connections of the measurement system, using the communication interfaces correspondingly provided in the measuring device electronics E1, E2.

As already indicated, the inline measuring device includes, in the example of an embodiment shown here, a measurement pickup of vibration-type, through which medium to be measured flows during operation, and which serves for producing in a through-flowing medium such mechanical reaction forces, especially Coriolis forces dependent on mass flow rate, inertial forces dependent on the density of the medium and/or frictional forces dependent on the viscosity of the medium, which react measurably, especially sensorially registerably, on the measurement pickup. On the basis of these reaction forces describing the medium, it is thus possible, in manner known to those skilled in the art, to measure mass flow, density and/or viscosity of the medium. To that extent, the mechanical construction of the measurement system corresponds essentially to that of the measurement system shown in U.S. Pat. No. 5,359,881.

Figure 4:
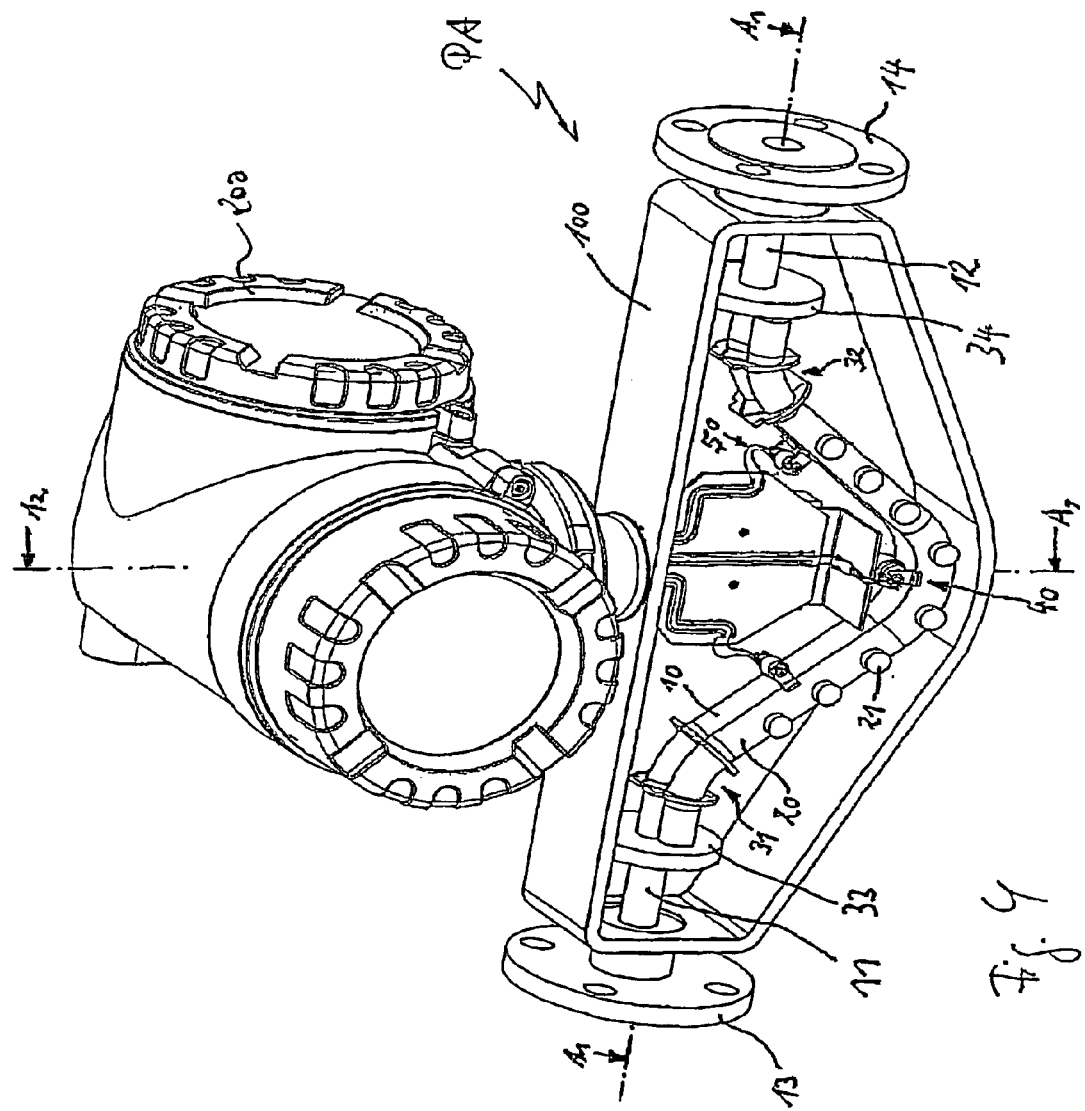
FIG. 4 perspectively, in a first side view, an example of an embodiment of an inline measuring device suited for one of the measurement systems shown in FIGS. 1 to 3 and equipped with a measurement pickup/transducer of vibation-type.

FIG. 4 shows, schematically, an example of an embodiment of a physical-to-electrical transducer arrangement serving as a measurement pickup 10 of vibration-type. The mechanical construction and manner of functioning of such a transducer arrangement is known, per se, to those skilled in the art and described in detail e.g. also in U.S. Pat. Nos. 6,860,158, 5,796,011 or 5,359,881. It is to be noted, additionally, here, that, for implementation of the invention, instead of a measurement pickup according to the example of an embodiment shown here, practically any of the measurement pickups known already to those skilled in the art for Coriolis mass flow/density measuring devices, especially also one of the bending oscillation types with a bent or straight measuring tube vibrating exclusively or at least partly in a bending oscillation mode, can be used. Other suited forms of embodiment for such transducer arrangements serving as measurement pickup 10 are described comprehensively and in detail e.g. in U.S. Pat. Nos. 6,691,583, 6,308,580, 5,301,557, 5,357,811, 5,557,973, 5,602,345, 5,648,616, WO-A 03/095949 or WO-A 03/095950, the disclosures of which are incorporated herein. Moreover, also e.g. magneto-inductive pickups or also ultrasonic measurement pickups known to those skilled in the art can be used.

For the conveying of the fluid to be measured, the measurement pickup includes, here, a single, curved measuring tube 10, which is connected via an inlet tube piece 11 opening on the inlet end and an outlet tube piece 12 opening on the outlet end, to the pipeline or also possible carrier tubes of the aforementioned pressure pickup. Inlet and outlet tube pieces 11, 12 are, as much as possible, aligned with one another as well as with an imagined, longitudinal axis Al of the measurement pickup. Moreover, measuring tube, inlet and outlet tube pieces 11, 12 are advantageously embodied as one piece, so that e.g. a single, tubular stock can serve for their manufacture; in case required, measuring tube 10, as well as the inlet and outlet tube pieces 11, 12 can, however, be manufactured also by means of separate, subsequently joined stock, which is e.g. welded together. For manufacturing measuring tube 10, it is possible, in such case, to use practically any of the materials usual for such measurement transducers, such as e.g. steel, Hastelloy, titanium, zirconium, tantalum, etc. It is to be noted here that, instead of the measurement pickup shown in the example of an embodiment, with a single curved, here, more U- or V-shaped, measuring tube, the measurement pickup serving for implementation of the invention can, as well, be selected from a large number of vibration-type measurement pickups known from the state of the art. Especially suited, for example, are also vibration-type measurement pickups including two straight or bent measuring tubes, for example extending essentially parallel to, and/or essentially equal in construction to, one another, through which the medium to be measured flows in parallel, such as are described, for example, also in U.S. Pat. No. 5,602,345, or also such with a single, straight, measuring tube; compare, in this regard, for example, also U.S. Pat. No. 6,840,109 or U.S. Pat. No. 6,006,609.

For the case, in which the measurement pickup is to be releasably mounted with the pipeline, first and second flanges 13, 14 can be formed in the usual manner on the inlet and outlet tube pieces 11, 12, respectively; in case required, the inlet and outlet tube pieces 11, 12 can also be connected directly with the pipeline, e.g. by means of welding or brazing.

Further provided affixed to the inlet and outlet tube pieces 11, 12 is, as shown schematically in FIG. 4, a housing 100 accommodating the measuring tube 10. Compared with the measuring tube, the housing is constructed to have greater bending and torsional stiffness. Besides the oscillatable holding of the measuring tube, the measurement pickup housing 100 also serves for housing the measuring tube 10, as well as possible other components of the measurement pickup and for protecting these, thus, from harmful environmental influences and/or for damping possible sound emissions of the measurement pickup to the outside. Beyond this, the measurement pickup housing 100 serves also as support for an electronics housing, which houses the measuring device electronics 50. For this purpose, measurement pickup housing 100 is provided with a necklike transition-piece, to which the electronics housing 200 is appropriately affixed. Instead of the more box-shaped transducer housing 100 shown here, it is, of course, also possible to use other suitable housing shapes matched to the particular shape of the actually used, measuring tube, such as e.g. tubular structures extending coaxially with the measuring tube.

As shown in FIG. 4, the measurement pickup of the example of an embodiment further includes a counteroscillator 20 for the measuring tube 10. Counteroscillator 20 is oscillatably affixed by means of an inlet-side, first coupler 31 to an inlet end of the measuring tube 10 and by means of an outlet-side, second coupler 32, especially one formed identically to coupler 31, to an outlet end of the measuring tube 10. Serving as coupler 31 can be, in such case, e.g. one, or, as also shown in FIG. 4, two node-plates, which are secured in appropriate manner, in each case, to the measuring tube 10 and the counteroscillator 20 on the inlet side; analogously thereto, also the coupler 32 can be realized by means of node-plates secured to the measuring tube 10 and the counteroscillator 20 on the outlet side. The here likewise tubular counteroscillator 20 is spaced from the measuring tube 10 and arranged in the measurement transducer essentially parallel thereto. Measuring tube 10 and counteroscillator 20 can, in such case, be so embodied that they may have, with outer spatial forms as identical as possible, equal, or at least mutually similar, especially mutually proportional, mass distributions. It can, however, be of advantage to shape the counteroscillator 20 nonidentically to the measuring tube 10; e.g. the counteroscillator 20 can also, if required, be arranged to extend in the measurement transducer coaxially with the measuring tube 10.

For producing the above-mentioned reaction forces in the fluid, the measuring tube 13 is, during operation of the measurement pickup 10, caused to vibrate, driven by an electromechanical exciter mechanism 40 coupled with the measuring tube 10, at a predeterminable exciter frequency $f_{exc}$, especially a natural resonance frequency, in the so-called wanted mode and is, consequently, elastically deformed in predeterminable manner. In the present example of an embodiment, the measuring tube 10, as usual in the case of vibration-type measurement transducers of such character, is so excited in the wanted mode to cantilever oscillations, that it executes, at least in part, cantilever-type, bending oscillations, moving with a pendulum-like motion about an imagined longitudinal axis essentially aligned with the inlet tube piece 11 and the outlet tube piece 12 of the measurement pickup. Simultaneously, the counteroscillator 20 is also excited to cantilever oscillations, and, indeed, such that it, at least in the case of medium at rest, oscillates essentially in the same form, and yet with opposite phase, compared with the measuring tube 10 oscillating in the wanted mode. In other words, measuring tube 10 and counteroscillator 20 move, thus, in the manner of oscillating tuning-fork tines.

For the case, in which the medium is flowing at such time and, consequently, the mass flow rate m is different from zero, Coriolis forces are induced by means of the medium flowing through the measuring tube 10 while oscillating in the wanted mode. These, in turn, react on the measuring tube 10 and effect, in manner known to those skilled in the art, additional, sensorially registerable deformations of the measuring tube 10. These deformations are superimposed on the bending oscillations of the wanted mode in the form of a so-called Coriolis mode. The instantaneous character of the deformations of the measuring tube 10 is, in such case, especially as regards their amplitudes, also dependent on the instantaneous mass flow rate m and is registered by means of a corresponding sensor arrangement arranged on the measuring tube. In the present example of an embodiment, the Coriolis mode is, as usual in the case of such measurement transducers, developed as an antisymmetric, twist mode, in which the measuring tube 10 also executes rotary oscillations about an imagined normal axis A2 directed perpendicular to the longitudinal axis A1.

In an embodiment of the invention, the exciter-, or also wanted-, mode frequency $f_{exc}$ is so tuned, that it corresponds as accurately as possible to a natural eigenfrequency of the measuring tub 10, especially a lowest natural eigenfrequency, so that the measuring tube 10 deflects in bending essentially according to a natural form of eigenoscillation. In the case of use of a measuring tube made of high-grade steel, especially stainless, high-grade steel, having a nominal diameter of 29 mm, a wall thickness of about 1.5 mm, a stretched length of about 420 mm and a bridge length of 305 mm, measured from inlet end to outlet end, the lowest resonance frequency of the same would amount, for example, in the case of a density of zero, to about 490 Hz. Since the natural eigenfrequencies of such bending oscillation modes of measuring tubes depend, to a considerable degree, also on the density ρ of the medium, it is also possible, without more, to measure also the density ρ, in addition to the mass flow rate m.

Figure 5:
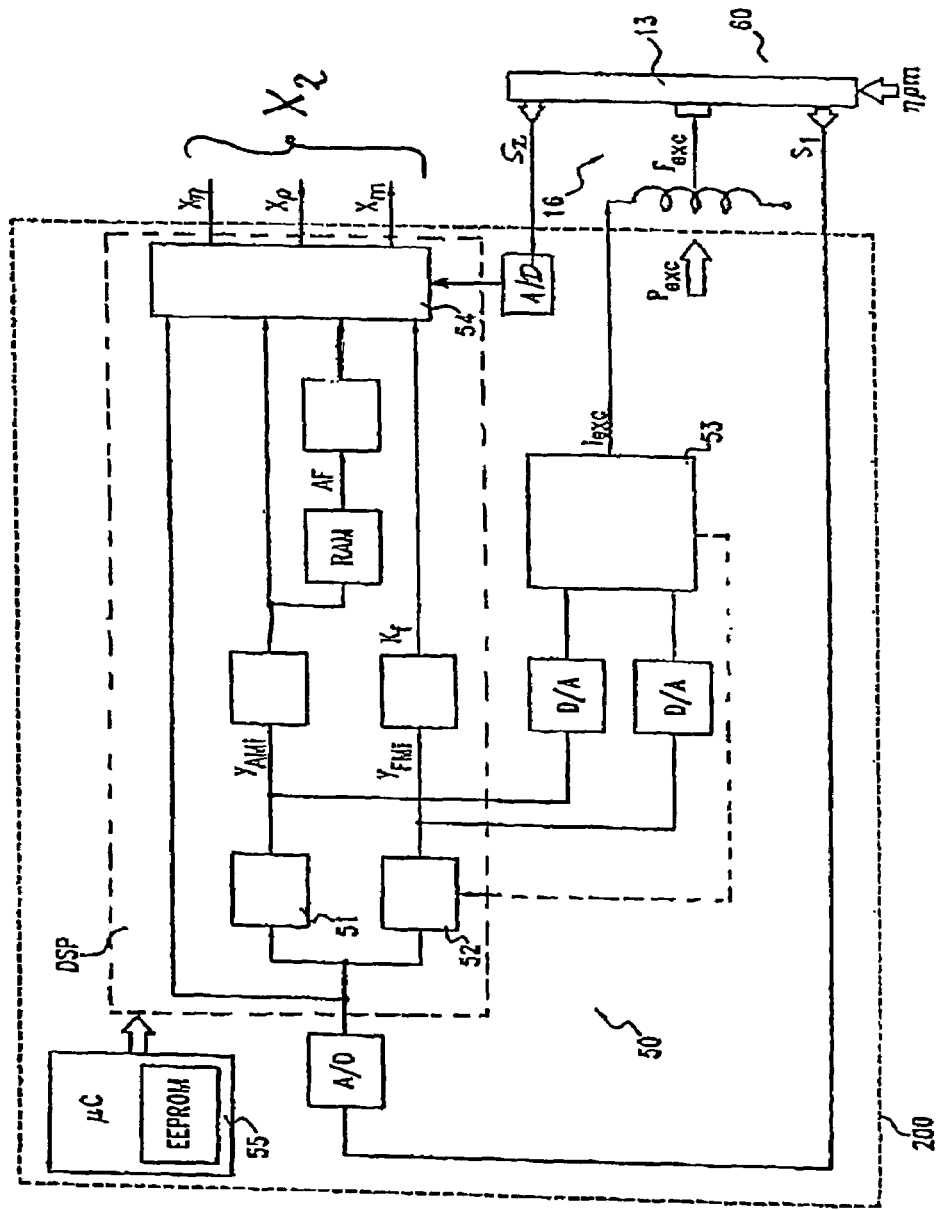
FIG. 5 an example of an embodiment of a measuring device electronics suited for the inline measuring device of FIG. 1, 2 or 3.

For producing vibrations of the measuring tube 10, the measurement pickup includes, additionally, as already mentioned, an electrical-to-physical, here, electrodynamic, exciter mechanism 40 arranged on the at least one measuring tube and acting, at least mediately, on the medium conveyed therein. This serves for converting an electrical exciter energy $E_{exc}$, e.g. having a controlled current and/or a controlled voltage, fed from a measurement and operating electronics 50 of the measuring device electronics E1 into an exciter force $F_{exc}$ acting, e.g. in pulse form or harmonically, on the measuring tube 10 and deflecting such in the above-described manner. FIG. 5 shows a corresponding example of an embodiment of the mentioned measuring and operating electronics 50. Driver circuits suited for the adjusting of the exciter energy $E_{exc}$ are shown e.g. in U.S. Pat. Nos. 4,777,833, 4,801,897, 4,879,911 or 5,009,109. The exciter force $F_{exc}$ can, as usual in the case of measurement transducers of such type, be embodied bidirectionally or unidirectionally and can be adjusted in manner known to those skilled in the art, e.g. by means of a current-, and/or voltage-, control circuit with respect to its amplitude, and e.g. by means of a phase control circuit with respect to its frequency. The exciter mechanism 40 can be e.g. a simple plunger coil, or solenoid, arrangement, with a cylindrical exciter coil secured to the counteroscillator 20 and flowed through during operation by a corresponding exciter current, and a permanent magnet armature plunging at least partially into the exciter coil and affixed externally, especially at the halfway point of the measuring tube 10, on the measuring tube 10. Additionally capable of serving as exciter mechanism 40 is e.g. an electromagnet.

For detecting and registering vibrations, especially bending oscillations, of the measuring tube 10, the measurement pickup includes, additionally, a sensor arrangement 50. The sensor arrangement 50 can be practically any of the sensor arrangements usually used for such kinds of measurement transducers for registering the movements of the measuring tube 10, especially its movements on its inlet, and outlet, sides, and for converting such into corresponding oscillation signals delivered by the sensor arrangement. Thus, the sensor arrangement 50 can, e.g. in the manner known to those skilled in the art, be formed by means of a first sensor arranged on the inlet side of the measuring tube 10 and by means of a second sensor arranged on the outlet side of the measuring tube 10. Examples of sensors, in such case, for measuring the oscillations are relatively measuring, electrodynamic, velocity sensors or, however, also electrodynamic path-measuring sensors, or acceleration sensors. Instead of electrodynamic sensor arrangements, additionally sensor arrangements measuring by means of resistive or piezoelectric strain gages, or optoelectronic sensor arrangements can serve for detecting the oscillations of the measuring tube 10. In case required, it is, moreover, possible to apply, in manner known to those skilled in the art, still other sensors needed for the measuring and/or for the operation of the measurement transducer, such as e.g. additional oscillation sensors arranged on the counteroscillator 20 and/or on the transducer housing 100 (compare, in this connection, also U.S. Pat. No. 5,736,653) or e.g. also temperature sensors arranged on the measuring tube 10, on the counteroscillator 20 and/or on the transducer housing 100 (compare, in this connection, also U.S. Pat. No. 4,768,384 or WO-A 00/102816).

For causing the measuring tube 10 to vibrate, the exciter mechanism 40 is, as already mentioned, fed by means of a likewise oscillating, especially multifrequent, exciter current $i_{exc}$ of adjustable amplitude and adjustable exciter frequency $f_{exc}$ in such a manner that the exciter coils (here, just one) are flowed through by the exciter current and, in corresponding manner, the magnetic fields needed for moving the corresponding armature are produced. The exciter current $i_{exc}$ can be e.g. harmonic, multifrequent or also rectangular. The lateral oscillation, exciter frequency $f_{excL}$ of exciter current $i_{exc}$ required for maintaining the oscillations of the measuring tube 10 can, in the case of the measurement pickup shown in the example of an embodiment, be so selected and tuned, that the laterally oscillating measuring tube 10 oscillates essentially in a bending oscillation, fundamental mode with a single oscillation antinode. For producing and tuning the exciter current $i_{exc}$, the measuring and operating electronics 50 includes, as shown in FIG. 5, a corresponding driver circuit 53, which is controlled by a frequency adjusting signal $y_{FM}$ representing the exciter frequency $f_{exc}$ to be set, and by an amplitude adjusting signal $y_{AM}$ representing the amplitude to be set for the exciter current $i_{exc}$. The driver circuit 53 can be realized e.g. by means of a voltage-controlled oscillator and a voltage-to-current converter connected downstream thereof; instead of an analog oscillator, however, also e.g. a numerically controlled, digital oscillator can be used for tuning the instantaneous exciter current $i_{exc}$. For producing the amplitude adjusting signal $y_{AM}$, an amplitude control circuit 51 integrated into the measuring and operating electronics 50 can serve, which updates the amplitude adjusting signal $y_{AM}$ on the basis of the instantaneous amplitudes of at least one of the two oscillation measurement signals $s_1$, $s_2$, measured at the instantaneous lateral oscillation frequency, as well as on the basis of corresponding, constant or variable, amplitude reference values for the oscillations W; if required, also instantaneous amplitudes of the exciter current $i_{exc}$ can be brought-in for generating the amplitude adjustment signal $y_{AM}$; compare FIG. 5. Construction and manner of operation of such amplitude control circuits are likewise known to those skilled in the art. For an example of such amplitude control circuits, reference is made to measuring transmitters of the series "PROMASS 80", such as are available from the assignee, for example in connection with measurement pickups of the series "PROMASS F" or "PROMASS H". Their amplitude control circuit is advantageously so embodied, that the lateral oscillations of the measuring tube 10 are controlled to a constant amplitude, thus an amplitude also independent of the density, ρ.

The frequency control circuit 52 and the driver circuit 53 can be embodied e.g. as a phase-locked loop (PLL), which is used, in manner known to those skilled in the art, on the basis of a phase difference measured between at least one of the oscillation measurement signals $s_1$, $s_2$ and the exciter current $i_{exc}$ to be set, or the instantaneously measured exciter current $i_{exc}$, for adjusting the frequency adjusting signal $y_{FM}$ continually to the instantaneous eigenfrequencies of the measuring tube 10. The construction and use of such phase-locked loops for driving measuring tubes at one of their mechanical eigenfrequencies is described in detail e.g. in U.S. Pat. No. 4,801,897. Of course, also other frequency control circuits known to those skilled in the art can be used, such as proposed e.g. also in U.S. Pat. No. 4,524,610 or U.S. Pat. No. 4,801,897. Additionally, reference to made to the already mentioned, measuring transmitters of the series "PROMASS 80" with respect to an application of such frequency control circuits for measurement pickups of vibration type. Other circuits suited as driver circuits can also be taken, for example, from U.S. Pat. No. 5,869,770 or U.S. Pat. No. 6,505,519.

In a further embodiment of the invention, the amplitude control circuit 51 and the frequency control circuit 52 are realized, as shown schematically in FIG. 5, by means of a digital signal processor DSP provided in the measuring and operating electronics 50 and by means of program code correspondingly implemented in such and running therein. The program code can be stored persistently or, however, also permanently, e.g. in a non-volatile memory EEPROM of a microcomputer 55 controlling and/or monitoring the signal processor, and loaded into a volatile data memory RAM of the measuring and operating electronics 50, e.g. RAM integrated in the signal processor DSP, upon startup of the signal processor. Signal processors suited for such applications are e.g. those of type TMS320VC33 available from the firm Texas Instruments Inc. Of course, the oscillation measurement signals $s_1$, $s_2$ must be converted into corresponding digital signals by means of corresponding analog-to-digital converters A/D for a processing in the signal processor DSP; compare, in this connection, especially EP-A 866 319. In case required, adjusting signals issued by the signal processor, such as e.g. the amplitude adjustment signal $y_{AML}$ or the frequency adjustment signal $y_{FM}$, are to be converted in corresponding manner, from digital to analog.

As shown in FIG. 5, the measurement signals $s_1$, $s_2$ delivered by the sensor arrangement and, as required, first suitably conditioned, are fed, additionally, to a corresponding measuring circuit 54 of the measuring and operating electronics 50, which serves for producing, on the basis of at least one of the measurement signals $s_1$, $s_2$ and/or on the basis of the exciter current $i_{exc}$, the at least one measured value of the second kind $X_2$. In an embodiment of the invention, the measuring circuit 54 is at least in part embodied as a flow calculator and serves, in manner known per se to those skilled in the art, for determining a measured value $X_2$ of the second type serving, here, as mass flow measured value $X_m$, on the basis of a phase difference detected between the oscillation measurement signals $s_1$, $s_2$ generated in the case of a measuring tube 10 laterally oscillating, at least in part, and representing, as accurately as possible, the mass flow rate m to be measured. Measuring circuit 21 can, in such case, be one of the measuring circuits, especially digital, already used in conventional Coriolis mass flow measuring devices for determining mass flow rate on the basis of the oscillation measurement signals $s_1$, $s_2$; compare, in this connection, especially the initially mentioned WO-A 02/37063, WO-A 99/39164, U.S. Pat. Nos. 5,648,616, 5,069,074. Of course, also other measuring circuits known to those skilled in the art as suitable for Coriolis mass flow measuring devices can be used, which measure and correspondingly evaluate the phase and/or time differences between oscillation measurement signals of the described kind. Furthermore, the measuring circuit 54 can also serve for generating, derived from an oscillation frequency of the at least one, vibrating measuring tube 11, which frequency is measured for example on the basis of at least one of the oscillation measurement signals $s_1$, $s_2$, a measured value $X_2$ of the second kind usable as density measured value Xρ and instantaneously representing a density ρ of the medium, or of a phase of the medium. Alternatively or in supplementation, the measuring circuit can also serve for producing a measured value $X_2$ of the second kind usable as viscosity measured value Xη and instantaneously representing a viscosity η of the medium, or of a phase of the medium. It is clear, without more, for those skilled in art, that the inline measuring device can determine the individual measured values $X_2$ for the different measured variables m, ρ, η both, in each case, in a common measurement cycle, thus with an equal update rate, or also with different update rates. For example, a highly accurate measurement of the most often considerably varying mass flow rate m usually requires a very high sampling and update rate, while, in comparison therewith, the, over a longer period of time, most often, less changeable density ρ and/or viscosity η of the medium can be updated, as required, at greater time intervals. Furthermore, it is possible, without more, to assume, that currently determined measured values $X_2$ can be intermediately stored in the measuring device electronics E1 and so be kept for subsequent uses. In advantageous manner, the measuring circuit 54 can, furthermore, be implemented, at least partially, also by means of the mentioned signal processor DSP.

Since the flow measurement pickup 10 shown here is essentially a multivariable measurement pickup, with which can be detected, in alternation, or also simultaneously, e.g. the mass flow rate, m, on the basis of the two sensor signals $s_1$, $s_2$, and/or the density, ρ, on the basis of the oscillation frequency $f_{exc}$ and/or the viscosity, η, of the fluid on the basis of the exciter current $i_{exc}$, it is possible within the framework of the present invention to think of the oscillation measurement signals $s_1$, $s_2$ delivered by the sensor arrangement, and the exciter current $i_{exc}$, separately or also in combination, as "measurement signals". Equally, corresponding measured voltages of the devices used, as required, instead of the Coriolis mass flow meter, such as voltages measured in the cases of magneto-inductive flow meters, vortex flow measuring devices or also ultrasonic flow measuring devices, can be measurement signals. It is also to be noted, that, for the case in which a magneto-inductive flow pickup serves as measurement pickup, instead of the above-discussed exciter arrangement, a coil arrangement can be used, in manner known to those skilled in the art, as exciter mechanism, which, flowed through by an exciter current, couples a magnetic field into the fluid in the measuring tube. In corresponding manner, then, a voltage sensing, electrode arrangement serves as the sensor arrangement for out-coupling a measurement voltage induced in the fluid by means of the above-mentioned, magnetic field. For the case, in which an ultrasonic flow pickup serves as measurement pickup, an ultrasonic transducer is used as exciter mechanism, actuated by a corresponding exciter signal, in the manner known to those skilled in the art, for coupling ultrasonic waves into the fluid in the measuring tube. Likewise, usually also an ultrasonic transducer serves as sensor arrangement, for coupling the ultrasonic waves out of the fluid and converting them into a corresponding, measured voltage.

As already mentioned, the measuring system is especially provided for measuring the at least one flow parameter of the medium flowing in the pipeline also then, when such is developed as two or more phases. The medium can, in this case, be practically any streaming, or at least flowable, substance having at least one fluid phase, for example, an oil-water-gas mixture, or another liquid-gas mixture, a solid-entraining liquid, an aerosol, a spray, a powder, or the like.

However, in an embodiment of the invention, it is provided that the measured value $X_2$ of the second kind delivered by the inline measuring device is predominantly only generated, or at least only issued as a valid, measured value, when the medium is essentially developed as one phase or at least can be assumed to be one phase. As initially mentioned, the development of first and second phases in the flowing medium, for example gas bubbles and/or solid particles entrained in liquids can lead to increased measurement errors, especially in the case of inline measuring devices using a vibration-type measurement pickup, especially in the case of determining the mass flow rate m. Already discussed in the state of the art with reference thereto is the fact that this can immediately affect the phase difference measured between the two oscillation measurement signals $s_1$, $s_2$, as well as affecting the oscillation amplitude or the oscillation frequency of each of the two oscillation measurement signals, or the exciter current, as the case may be, thus practically every one of the operating parameters usually measured in the case of measuring device of the described kind. This is true, indeed, especially, as explained also in U.S. Pat. No. 6,880,410 or U.S. Pat. No. 6,505,519, for the operating parameters determined in the case of laterally oscillating measuring tube; it can, however, also not always be excluded for those operating parameters measured in the case of torsionally oscillating measuring tube; compare, in this connection, U.S. Pat. No. 4,524,610. Therefore, it is additionally provided that the flowing medium, especially internally in the measuring system itself, is repeatedly monitored concerning whether it can still be considered to be developed essentially as one phase, or whether it is developed now at least as two phases. The detection can occur, in such case, for example using the at least one measurement signal produced by means of the inline measuring device; compare, in this connection, also U.S. Pat. No. 6,910,366 or U.S. Pat. No. 6,505,519. For the case, in which the medium is recognized as being at least two-phase, it is further provided that the measured value $X_1$ of the first kind is issued as the measured value $X_M$ of the measurement system instantaneously representing the flow parameter to be measured. The measurement system is, thus, operated in a first operating mode, in the case of which the measured value $X_M$ varies practically only as a function of the registered pressures $p_1$, $p_2$, or the pressure-difference Δp derived therefrom. The at least one measurement signal produced by means of the inline measuring device can, in this first operating mode, serve especially for repeatedly monitoring the flowing medium concerning whether, or to what degree, it is developed as two, or more, phases. Additionally, it is provided in a further embodiment of the invention that the measured value $X_2$ of the first kind is issued as the measured value $X_M$ of the measurement system instantaneously representing the flow parameter to be measured, at least for the case, in which the medium is viewed as essentially one phase. The measurement system is, then, thus, operated in a second operating mode, in the case of which the measured value $X_M$, because of the above-mentioned, high measurement accuracy, varies practically exclusively, or at least in predominant measure, as a function of the at least one measurement signal produced by means of the inline measuring device 1. The at least one measurement signal produced by means of the inline measuring device can, in this second mode of operation, as already mentioned, additionally also serve for repeatedly monitoring the flowing medium concerning whether it is still developed essentially as one phase. In case required, for the purpose of decreasing the total electrical power consumption of the measurement system, in at least one of the two aforementioned operating modes, the then, in each case, not needed measurement pickup and/or the then, in each case, not needed measuring device electronics can be clocked at a lower rate, or, as required, set into a suitable ready-mode. For example, thus, in the first operating mode, the flow pickup DA and/or the measuring device electronics E1, or, in the second operating mode, at least one of the two pressure pickups $PA_1$, $PA_2$ and/or the measuring device electronics E2 can be turned off.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to be protected.

What is claimed is:

1. A method for measuring at least one flow parameter, especially a flow velocity, a mass flow or a volume flow, of, an at least at times, two or more phase medium flowing in a pipeline, with at least one of the phases of the medium being fluid, which method comprises the steps of:

causing the medium to be measured to flow through at least one measuring tube joined into the course of the pipeline, especially a measuring tube which vibrates, at least at times;

producing at least one measurement signal influenced by at least one physical parameter, especially a flow velocity, a mass flow, a volume flow, a density and/or a viscosity, of the medium in the measuring tube, using an inline measuring device sensor arrangement arranged on the measuring tube and/or in its vicinity and reacting, at least mediately, to changes of the at least one physical parameter of the medium;

registering pressures, especially static pressures, effective in the medium, in order to repeatedly determine a pressure difference existing in the flow medium, especially a pressure difference existing, at least in part, along the at least one measuring tube; and producing measured values of a first kind, which represent, especially digitally, following one after the other in time, the at least one flow parameter to be measured for the medium, taking into consideration a currently determined pressure difference for the flowing medium, as well as applying a transfer function, wherein:

the transfer function at least determines how the measured values of the first kind are generated taking into consideration the pressure difference currently determined for the flowing medium; and the transfer function is adapted repeatedly to the medium to be measured, taking into consideration the at least one measurement signal produced by means of the sensor arrangement of the inline measuring device.

2. The method as claimed in claim 1, further comprising the step of:

producing measured values of a second kind, which represent, following one after the other in time, the at least one parameter of the medium in the measuring tube, or a measured variable derived therefrom for the medium, by applying the at least one measurement signal produced by means of the inline measuring device.

3. The method as claimed in claim 2, wherein:

measured values of the first kind and measured values of the second kind are produced essentially simultaneously or at least at times near to one another.

4. The method as claimed in claim 2, wherein:

measured values of the first kind and measured values of the second kind are produced asynchronously or at least offset with respect to time, especially alternately.

5. The method as claimed in claim 2, wherein:

measured values of the second kind are produced, at least at times, when the medium is developed essentially as one phase or is at least assumed to be developed as one phase.

6. The method as claimed in claim 5, further comprising the step of:

repeatedly monitoring the flowing medium, especially by applying the at least one measurement signal produced by means of the inline measuring device.

7. The method as claimed in claim 6, further comprising a step of:

detecting that the medium is developed in the form of at least two phases.

8. The method as claimed in claim 2, wherein:

the measured values of the second kind represent a parameter of the medium, which corresponds essentially to the flow parameter represented by the measured values of the first kind.

9. The method as claimed in claim 2, wherein:

the measured values of the second kind represent a density of the medium in the measuring tube.

10. The method as claimed in claim 2, wherein:

the measured values of the second kind represent a viscosity of the medium in the measuring tube.

11. The method as claimed in claim 2, wherein:

the transfer function comprises a static, especially non-linear, characteristic line function; and for adapting the transfer function to the medium to be measured, at least one coefficient describing the transfer function is changed, taking into consideration at least one of the measured values of the second kind.

12. The method as claimed in claim 1, wherein:

the inline measuring device further includes an electrical-to-physical exciter mechanism arranged on the at least one measuring tube and acting, at least mediately, on the medium conveyed therein.

13. The method as claimed in claim 12, wherein:

the step of producing the first measurement signal comprises the following steps:

producing, by means of the exciter mechanism of the inline measuring device, reactions in the medium, which reactions correspond with the at least one physical parameter of the medium in the measuring tube; and registering, by means of the sensor arrangement of the inline measuring device, reactions of the medium corresponding to the at least one physical parameter of the medium in the measuring tube.

14. The method as claimed in claim 13, wherein:

the inline measuring device includes a measurement pickup of vibration-type, and wherein the step of producing reactions in the medium corresponding with the at least one, physical parameter of the medium in the measuring tube includes a step of causing the measuring tube to vibrate for producing reaction forces, especially inertial forces, frictional forces and/or Coriolis forces, in the medium conveyed in the measuring tube, for influencing vibrations of the measuring tube.

15. The method as claimed in the claim 14, wherein:

the step of registering reactions of the medium corresponding with the at least one physical parameter of the medium includes a step of registering vibrations of the measuring tube.

16. The method as claimed in claim 15, wherein:

the measured values of the second kind are determined, at least in part, on the basis of registered vibrations of the measuring tube.

17. The method as claimed in claim 14, wherein:

the sensor arrangement of the inline measuring device includes at least one oscillation sensor arranged on the measuring tube and/or in its vicinity, and wherein the at least one measurement signal produced by means of the sensor arrangement of the inline measuring device represents vibrations of the measuring tube.

18. The method as claimed in claim 17, wherein:
the measured values of the second kind are generated, at least at times and/or at least in part, based on an oscillation frequency of the vibrating measuring tube, especially with application of the at least one measurement signal.

19. The method as claimed in claim 17, wherein:
the sensor arrangement of the inline measuring device includes at least two oscillation sensors, especially ones spaced from one another in the stream direction of the medium, in each case arranged on the measuring tube and/or in its vicinity; and
the steps of producing the measurement signal by means of the sensor arrangement includes steps of producing at least a first measurement signal, especially one representing inlet-side vibrations of the measuring tube, by means of a first oscillation sensor of the sensor arrangement, and a second measurement signal, especially one representing outlet-side vibrations of the measuring tube, by means of a second oscillation sensor of the sensor arrangement.

20. The method as claimed in claim 19, wherein:
the measured values of the second kind represent a mass flow or a volume flow of the medium; and
for determining at least one of these measured values of the second kind, the at least two measurement signals produced by means of the sensor arrangement of the inline measuring device are applied.

21. The method as claimed in claim 19, wherein:
the measured values of the second kind are determined, at least at times and/or at least in part, based on a phase difference existing between the first and second measurement signals.

22. The method as claimed in claim 1, wherein:
the steps of registering pressures effective in the medium include steps of registering at least one pressure effective in the flowing medium at the inlet-side of the at least one measuring tube and/or registering at least one pressure effective in the flowing medium at the outlet-side of the at least one measuring tube.

23. The method as claimed in claim 22, wherein:
at least at times, at least a first pressure in the medium registered at the inlet-side of the measuring tube and at least a second pressure in the medium registered at the outlet-side of the measuring tube, especially a pressure difference in the flowing medium determined on the basis of the first and second pressures, are taken into consideration in producing the measured values representing the at least one physical, flow parameter.

24. The method as claimed in claim 1, wherein:
for registering pressures existing in the flowing medium, at least two pressure pickups are used, of which a first pressure pickup is arranged at the inlet-side of the at least one measuring tube and a second pressure pickup is arranged at the outlet-side of the at least one measuring tube.

25. The method as claimed in claim 24, wherein:
the steps of registering pressures effective in the medium include steps of transmitting pressures registered by means of the first and second pressure pickups via pressure intermediaries to a pressure measuring cell, especially a differentially and/or capacitively measuring, pressure measuring cell.

26. The method as claimed in claim 25, wherein:
the steps of registering pressures effective in the medium include steps of converting pressures transmitted to the pressure measuring cell into at least one measurement signal, which reacts to time changes of at least one of the registered changes with a corresponding change of at least one of its properties.

27. The method as claimed in claim 1, wherein:
the transfer function comprises a static, especially nonlinear, characteristic line function.

28. The method as claimed in claim 27, wherein:
for adapting the transfer function to the medium to be measured, at least one coefficient describing the transfer function is changed by applying the at least one measurement signal produced by means of the sensor arrangement of the inline measuring device.

29. The measuring system for measuring at least one physical, flow parameter, especially a mass and/or volume flow and/or a flow velocity, of an, at least at times, two, or more, phase medium flowing in a pipeline, wherein at least one phase of the medium is fluid, which measuring system comprises:
an inline measuring device for flowing media, said inline measuring device including a flow pickup, as well as measuring device electronics electrically coupled, at least at times, therewith, and the flow pickup includes at least one measuring tube inserted into the course of the pipeline conveying the medium, especially a measuring tube vibrating, at least at times, during operation; and
a pressure-difference measuring device including a first pressure pickup, especially one arranged at the inlet side of the flow pickup, for registering a first pressure existing in the medium, and a second pressure pickup, especially one arranged at the outlet side of the flow pickup, for registering a second pressure existing in the medium, as well as including measuring device electronics, which, at least at times, is electrically coupled with the pressure pickups and, at least at times, is electrically coupled with the measuring device electronics of the inline measuring device, wherein:
at least one of said two measuring device electronics, on the basis of a transfer function stored therein, as well as based on the pressures registered by means of the first and second pressure pickups, at least at times, produces measured values of a first kind, which represent, in time following one after the other, especially digitally, the at least one flow parameter of the medium to be measured;
said measuring device electronics of the inline measuring device produces, at least at times, measured values of a second kind, which represent, in time following one after the other, especially digitally, the at least one parameter, or a measured variable derived therefrom, of the medium in the at least one measuring tube; and
said transfer function determines, at least, how the measured values of the first kind are generated on the basis of the currently registered, first and second pressures, and is adapted to the medium to be measured, taking into consideration at least one of the measured values of the second kind produced by means of the inline measuring device.

30. The measurement system as claimed in claim 29, wherein:
said at least one measuring tube vibrates, at least at times, during operation.

31. The measurement system as claimed in claim 30, wherein:
said flow pickup delivers at least one measured signal representing vibrations of said at least one measuring tube.

32. The measurement system as claimed in claim 29, wherein:
said at least one measuring tube is essentially straight.

33. The measurement system as claimed in claim 29, wherein:
said at least one measuring tube is curved, especially in U- or V-shape.

34. The measurement system as claimed in claim 29, wherein:
two measuring tubes are inserted into the course of the pipeline, especially measuring tubes extending essentially parallel to one another and/or essentially of equal construction.

35. The measurement system as claimed in claim 29, wherein:
two pressure pickups are connected with a pressure measurement cell, especially one measuring differentially or capacitively, to form a pressure-difference pickup.

36. The measurement system as claimed in claim 35, wherein:
said difference-pressure pickup delivers at least one measurement signal representing a pressure difference in the flowing medium.

37. The measurement system as claimed in claim 29, further comprising:
first measuring device electronics, as well as second measuring device electronics communicating, at least at times, with the first measuring device electronics, wherein:
said flow pickup is electrically coupled with said first measuring device electronics to form an inline measuring device for media flowing in pipelines, especially a Coriolis mass flow/density measuring device;
and said two pressure pickups are electrically coupled with the second measuring device electronics to form a pressure difference measuring device for media flowing in pipelines.

38. The use of a measurement system for measuring a mass-, or volume-, flow and/or a flow velocity of a multiphase, especially a two-phase, medium flowing in a pipeline, including:
an inline measuring device for flowing media, said inline measuring device including a flow pickup, as well as measuring device electronics electrically coupled, at least at times, therewith, and the flow pickup includes at least one measuring tube inserted into the course of the pipeline conveying the medium, especially a measuring tube vibrating, at least at times, during operation; and
a pressure-difference measuring device including a first pressure pickup, especially one arranged at the inlet side of the flow pickup, for registering a first pressure existing in the medium, and a second pressure pickup, especially one arranged at the outlet side of the flow pickup, for registering a second pressure existing in the medium, as well as including measuring device electronics, which, at least at times, is electrically coupled with the pressure pickups and, at least at times, is electrically coupled with the measuring device electronics of the inline measuring device, wherein:
at least one of said two measuring device electronics, on the basis of a transfer function stored therein, as well as based on the pressures registered by means of the first and second pressure pickups, at least at times, produces measured values of a first kind, which represent, in time following one after the other, especially digitally, the at least one flow parameter of the medium to be measured;
said measuring device electronics of the inline measuring device produces, at least at times, measured values of a second kind, which represent, in time following one after the other, especially digitally, the at least one parameter, or a measured variable derived therefrom, of the medium in the at least one measuring tube; and
said transfer function determines, at least, how the measured values of the first kind are generated on the basis of the currently registered, first and second pressures, and is adapted to the medium to be measured, taking into consideration at least one of the measured values of the second kind produced by means of the inline measuring device;
said use comprising:
causing the medium to be measured to flow through at least one measuring tube joined into the course of the pipeline, especially a measuring tube which vibrates, at least at times;
producing at least one measurement signal influenced by at least one physical parameter, especially a flow velocity, a mass flow, a volume flow, a density and/or a viscosity, of the medium in the measuring tube, using an inline measuring device sensor arrangement arranged on the measuring tube and/or in its vicinity and reacting, at least mediately, to changes of the at least one physical parameter of the medium;
registering pressures, especially static pressures, effective in the medium, in order to repeatedly determine a pressure difference existing in the flow medium, especially a pressure difference existing, at least in part, along the at least one measuring tube; and
producing measured values of a first kind, which represent, especially digitally, following one after the other in time, the at least one flow parameter to be measured for the medium, taking into consideration a currently determined pressure difference for the flowing medium, as well as applying a transfer function, wherein:
the transfer function at least determines how the measured values of the first kind are generated taking into consideration the pressure difference currently determined for the flowing medium; and
the transfer function is adapted repeatedly to the medium to be measured, taking into consideration the at least one measurement signal produced by means of the sensor arrangement of the inline measuring device.

* * * * *